(12) United States Patent
Takeo

(10) Patent No.: US 9,476,476 B2
(45) Date of Patent: Oct. 25, 2016

(54) SHOCK ABSORBER

(71) Applicant: KAYABA INDUSTRY CO., LTD., Tokyo (JP)

(72) Inventor: Satoru Takeo, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/419,277

(22) PCT Filed: Jul. 23, 2013

(86) PCT No.: PCT/JP2013/069892
§ 371 (c)(1),
(2) Date: Feb. 3, 2015

(87) PCT Pub. No.: WO2014/024676
PCT Pub. Date: Feb. 13, 2014

(65) Prior Publication Data
US 2015/0204409 A1    Jul. 23, 2015

(30) Foreign Application Priority Data
Aug. 10, 2012 (JP) ................ 2012-177903

(51) Int. Cl.
*F16F 9/38* (2006.01)

(52) U.S. Cl.
CPC ..................... *F16F 9/38* (2013.01)

(58) Field of Classification Search
CPC ............. F16F 9/38; F16F 9/36; F16F 9/3285
USPC ...................... 188/322.12, 322.19
See application file for complete search history.

(56) References Cited

U.S. PATENT DOCUMENTS

| | | | | | |
|---|---|---|---|---|---|
| 923,858 | A | * | 6/1909 | Kilgore | F16F 9/44 188/313 |
| 2,522,323 | A | * | 9/1950 | Whisler, Jr. | F16F 9/36 188/322.12 |
| 3,830,083 | A | * | 8/1974 | Hadick | F16D 3/845 277/636 |
| 4,235,426 | A | * | 11/1980 | Sullivan, Jr. | B60G 11/52 188/322.12 |
| 4,529,213 | A | * | 7/1985 | Goodman | F16F 9/38 188/322.12 |
| 4,739,976 | A | * | 4/1988 | Myers | F16F 9/063 188/269 |
| 5,074,390 | A | * | 12/1991 | Fuhrmann | F16F 9/38 188/322.12 |
| 5,402,868 | A | * | 4/1995 | Handke | F16F 9/58 188/322.12 |
| 5,472,072 | A | * | 12/1995 | Bumgarner | F16F 9/003 188/322.12 |

(Continued)

FOREIGN PATENT DOCUMENTS

DE          1041742 B    10/1958
JP          S58-92536 U   6/1983

(Continued)

OTHER PUBLICATIONS

Machine Translation in English for JP 2007-71246A, Inventor: Ogawa; 5 pages; Retrieve Date: Feb. 3, 2016.*

*Primary Examiner* — Thomas J Williams
*Assistant Examiner* — Mariano Sy
(74) *Attorney, Agent, or Firm* — Rabin & Berdo, P.C.

(57) ABSTRACT

A shock absorber including a cylindrical outer shell and a piston rod slidably inserted into the outer shell, the shock absorber includes a cylindrical dust cover coupled to the piston rod and permitting an entry of the outer shell to inside thereof; and an annular dust filter whose inner peripheral side is attached to the outer shell and whose outer periphery is brought into slidable contact with an inner periphery of the dust cover at all times.

1 Claim, 2 Drawing Sheets

(56) References Cited

U.S. PATENT DOCUMENTS

| | | | | |
|---|---|---|---|---|
| 7,416,064 B2* | 8/2008 | Beck | ............... | F16F 9/38 188/322.12 |
| 2015/0096855 A1* | 4/2015 | Takeo | ............... | B60G 13/02 188/322.12 |
| 2015/0167775 A1* | 6/2015 | Takeo | ............... | F16F 9/38 188/322.12 |

FOREIGN PATENT DOCUMENTS

| | | | |
|---|---|---|---|
| JP | S63-79204 U | | 5/1988 |
| JP | 05-256306 A | | 10/1993 |
| JP | 2000-081071 A | | 3/2000 |
| JP | 2000-356236 A | | 12/2000 |
| JP | 2007-071246 A | | 3/2007 |
| JP | 2007071246 A | * | 3/2007 |
| JP | 2010-175043 A | | 8/2010 |

* cited by examiner

SHOCK ABSORBER

TECHNICAL FIELD

The present invention relates to a shock absorber.

BACKGROUND ART

A shock absorber includes an outer shell and a piston rod that is slidably inserted into the outer shell. When the piston rod moves relatively to the outer shell in the axial direction, the shock absorber exhibits damping force that suppresses the relative movement of the piston rod relative to the outer shell. Such a shock absorber is used by being interposed between a body and an axle, or between a cabin and the body in a vehicle, for example. Vibration of an object to be damped, such as the body, the cabin or the like, can be suppressed by the damping force exhibited by the shock absorber.

As the shock absorber like this is exposed to the outside for use, dirt, dust and mud (hereinafter referred to as "mud or the like") are easily adhered onto the piston rod. The mud or the like, adhered onto the outer periphery of the piston rod, is scraped off by a dust seal that seals the outer periphery of the piston rod, when the piston rod enters the outer shell. However, when the mud or the like is dried and adhered onto the piston rod stubbornly, it cannot be scraped off properly by the dust seal. This may facilitate deterioration in oil seal provided on an inner side of the dust seal. For this reason, according to the shock absorber as disclosed in JP2000-81071A or JP2010-175043A, a dust cover that covers the outer periphery of the piston rod is mounted so as to protect the piston rod from the mud or the like.

SUMMARY OF INVENTION

With the shock absorber including the dust cover as described above, the adherence of the mud or the like onto the piston rod can be prevented to a greater extent as the length of the dust cover becomes longer. When the length of the dust cover becomes longer, however, the dust cover covers the outer shell when the outer surface of the outer shell is subjected to spray coating. Thus, an uncoated part is caused at the upper end of the outer shell in particular. The uncoated part on the outer shell like this is not preferable from the viewpoint of rust prevention on the outer shell.

For this reason, the dust cover of the shock absorber as disclosed in JP2000-81071A has such total length that slightly covers the upper end of the outer shell when it is expanded to the utmost, so that the uncoated part is not caused. In such a case, however, the mud or the like easily enters the dust cover from a space between the outer shell and the dust cover, as a result of which the effect of protecting the outer periphery of the piston rod is decreased.

Further, the dust cover of the shock absorber as disclosed in JP2010-175043A has such total length that an entry of the mud or the like can be suppressed sufficiently. Therefore, the spray coating is carried out before attaching the dust cover. In this case, however, such processing is required as to push the piston rod into the outer shell, keep the shock absorber in the most contracted state, and then subject the outer periphery of the outer shell to the spray coating, so as to prevent a sliding surface on the outer periphery of the piston rod from being coated. Such processing has the need to set the shock absorber on a machine for the spray coating, and mask the outer periphery of the piston rod before coating the outer shell, and hence, the coating method becomes complicated. Thus, a new problem is caused, that is, labor and a man-hour are required for the coating processing.

An object of the present invention is to provide a shock absorber that can protect the outer periphery of the piston rod sufficiently, and that does not deteriorate coating workability.

According to one aspect of the present invention, a shock absorber including a cylindrical outer shell and a piston rod slidably inserted into the outer shell, the shock absorber includes a cylindrical dust cover coupled to the piston rod and permitting an entry of the outer shell to inside thereof; and an annular dust filter whose inner peripheral side is attached to the outer shell and whose outer periphery is brought into slidable contact with an inner periphery of the dust cover at all times.

DESCRIPTION OF EMBODIMENTS

Hereinafter, an embodiment of the present invention will be explained with reference to the drawings.

Figure 1:
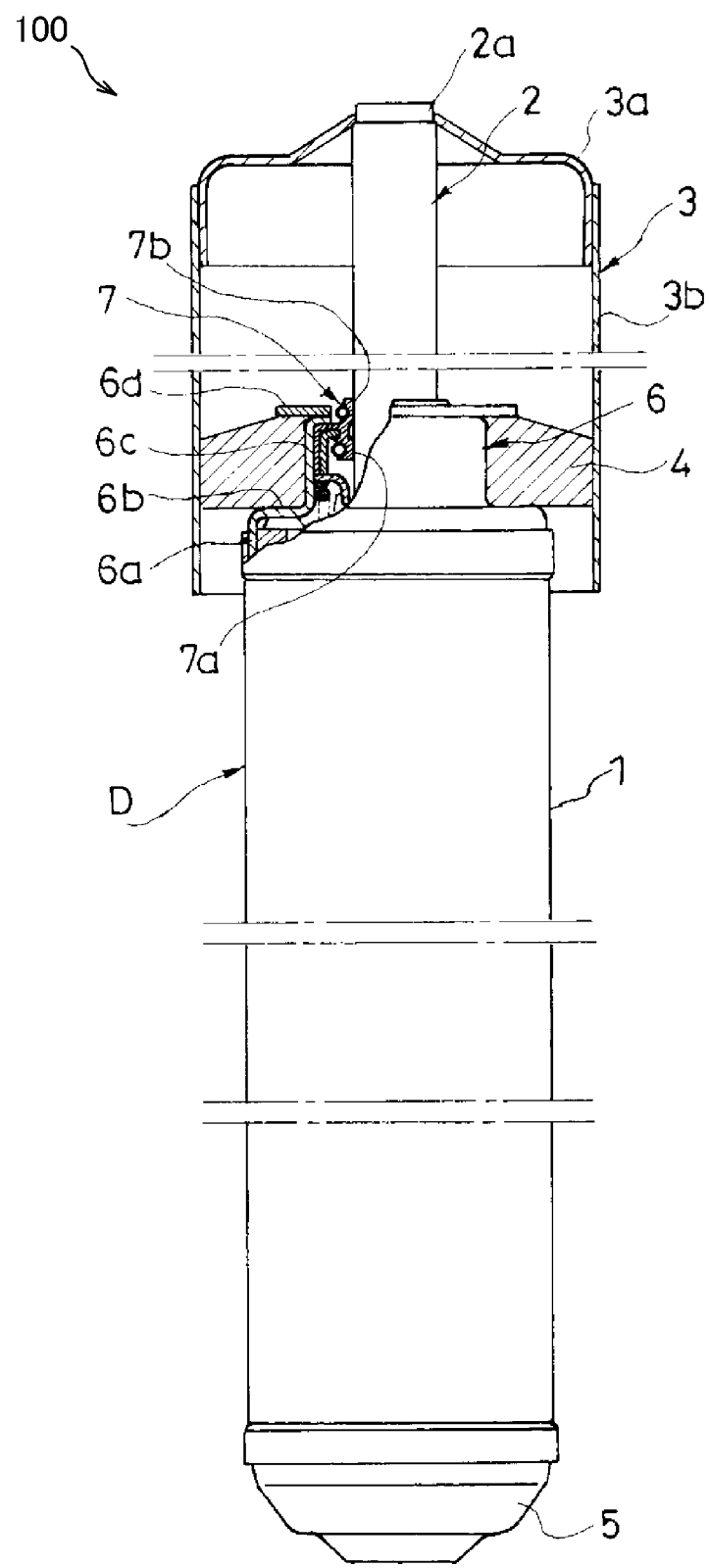
FIG. 1 is a side view of a shock absorber according to an embodiment.

As illustrated in FIG. 1, a shock absorber 100 according to this embodiment includes a shock absorber body D that has a cylindrical outer shell 1 and a piston rod 2 capable of sliding inside the outer shell 1, a cylindrical dust cover 3 that is coupled to the piston rod 2 and that permits an entry of the outer shell 1 to inside thereof, and an annular dust filter 4 whose inner peripheral side is attached to the outer shell 1 and whose outer periphery is brought into slidable contact with the inner periphery of the dust cover 3 at all times.

Although not illustrated specifically, the shock absorber body D includes, for example, an inner tube that is received inside the outer shell 1, a piston that is slidably inserted inside the inner tube, the piston rod 2 that is movably inserted into the inner tube with its one end being coupled to the piston, an expanding-side chamber and a contracting-side chamber that are divided by the piston inside the inner tube, and a passage that allows the expanding-side chamber and the contracting-side chamber to communicate. A hydraulic fluid, such as hydraulic oil, is filled inside the expanding-side chamber and the contracting-side chamber. For example, liquids such as water, aqueous solution and the like may be used as the hydraulic fluid, other than the hydraulic oil.

When the piston rod 2 makes relative movement in the axial direction relative to the outer shell 1 by external forces, in other words, when the shock absorber body D expands and contracts by the external forces, the piston, together with the piston rod 2, moves in the axial direction, and allows the expanding-side chamber or the contracting-side chamber inside the inner tube to contract, as a result of which a pressure difference is caused between pressures of the expanding-side chamber and the contracting-side chamber. By receiving this pressure difference by the piston, the shock absorber body D exhibits damping force that suppresses the relative movement in the axial direction of the outer shell 1 and the piston rod 2.

The shock absorber body D according to this embodiment is a single-rod type, in which the piston rod 2 is inserted into the expanding-side chamber only. It should be noted that the shock absorber body D includes a reservoir that is formed as annular gap between the outer shell 1 and the inner tube and that has a gas and a liquid filled therein, although not illustrated. The reservoir compensates for the volume of the piston rod 2 that enters and exits from the outer shell, together with the expansion and contraction of the shock absorber body D. Thus, the shock absorber body D according to this embodiment is a single-rod multi-cylinder type. In a case where the piston divides the inside of the outer shell 1 into the expanding-side chamber and the contracting-side chamber with being allowed to move slidingly and directly on the inner periphery of the outer shell 1, an air chamber that compensates for the volume of the piston rod 2 may be defined in the outer shell 1 by inserting a free piston slidably inside the outer shell 1, or a gas chamber may be defined in the outer shell 1 by an elastic partition such as a bladder. In this case, the shock absorber body D may be a single-cylinder type without providing the inner tube. Moreover, the shock absorber body D may be a double-rod type, not the single-rod type.

Hereinafter, respective components will be explained in detail. First, the outer shell 1 is a cylindrical member, whose lower end in FIG. 1 is sealed by a cap 5, and whose upper end in FIG. 1, as the end on the piston rod side of the outer shell 1, has a cylindrical seal case 6 mounted thereon.

The seal case 6 includes with a cylindrical large-diameter portion 6a mounted on the inner periphery of the outer shell 1 at the end on the piston rod side, a flange portion 6b projecting from the large-diameter portion 6a at the end on the piston rod side toward the inner side in the radial direction, a cylindrical small-diameter portion 6c rising from the inner periphery of the flange portion 6b toward the upper end side, and an annular stopper 6d provided on the small-diameter portion 6c. The small-diameter portion 6c receives a seal member 7 therein. The stopper 6d has the outer diameter that is larger than the small-diameter portion 6c, and is mounted on the upper end of the small-diameter portion 6c by welding or the like.

The seal member 7 includes a seal portion 7a brought into slidable contact with the outer periphery of the piston rod 2 and sealing the outer periphery of the piston rod 2 so as to prevent leakage of the liquid from the outer shell 1, and a dust seal portion 7b scraping off dust adhered onto the outer periphery of the piston rod 2.

The dust cover 3 is mounted on an upper end 2a of the piston rod 2 in FIG. 1. The dust cover 3 includes an annular coupling portion 3a whose inner periphery is attached to the outer periphery of the piston rod 2, and a cover body 3b extending downwardly in FIG. 1 from the outer periphery of the coupling portion 3a. The inner diameter of the cover body 3b is larger than the outer diameter of the outer shell 1, and the outer shell 1 can enter the cover body 3b. Thus, the dust cover 3 does not hinder the expansion and contraction of the shock absorber body D.

Figure 2:
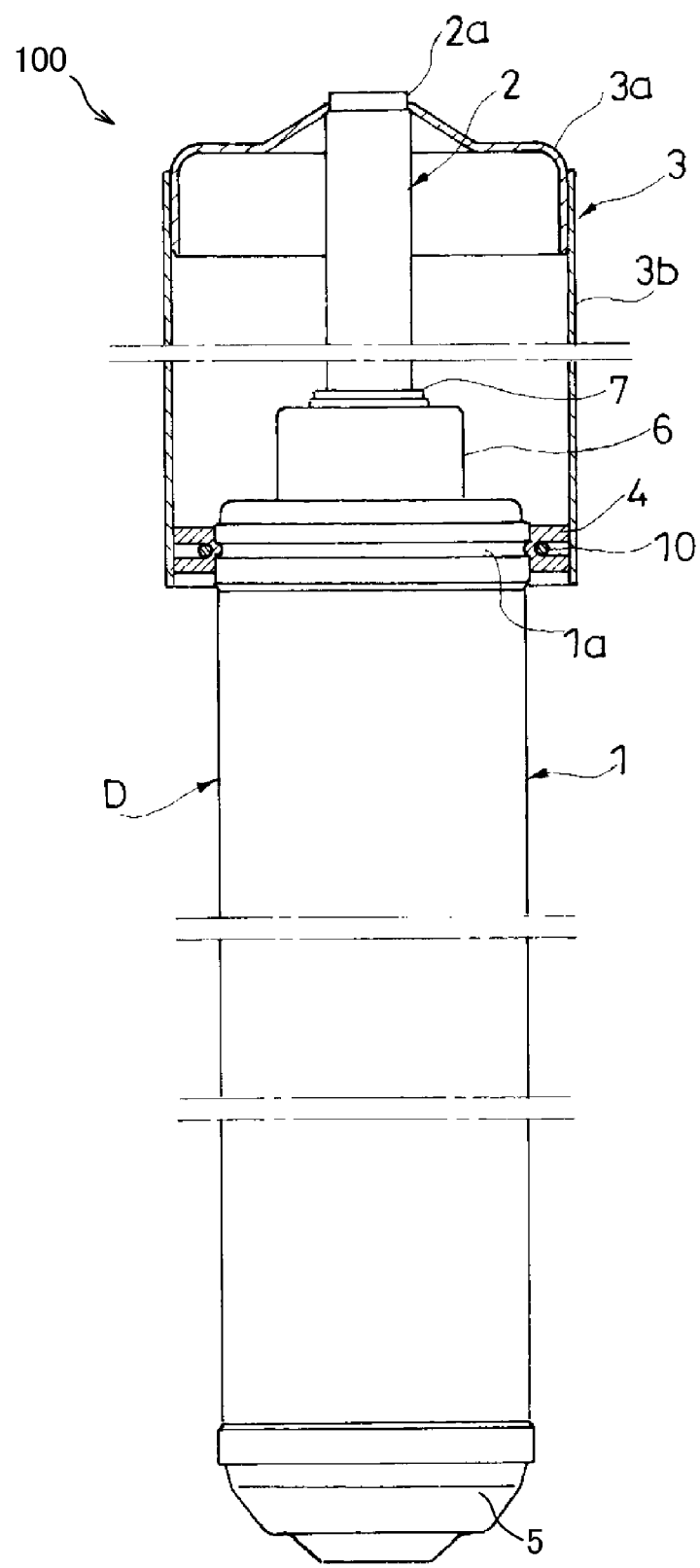
FIG. 2 is a side view of a shock absorber according to a modification example of the embodiment.

The dust filter 4, having an annular shape, is mounted on the outer shell 1 via the seal case 6 as its inner periphery side is sandwiched between the flange portion 6b and the stopper 6d. Moreover, as illustrated in FIG. 2, an annular fixing ring 10 that fastens the dust filter 4 from the outer periphery side may be provided on the outer periphery of the outer shell 1. In this case, the fixing ring 10 presses the dust filter 4 against the outer shell 1, and the dust filter 4 is fixed to and mounted on the outer shell 1. It should be noted that, when the fixing ring 10 is used to fix the dust filter 4, an annular recessed portion 1a may be provided on the outer periphery of the outer shell 1 in such a manner that the annular recessed portion 1a opposes to the fixing ring 10, in order to prevent displacement of the dust filter 4 in the axial direction. This is also suited for the case where the dust filter 4 is provided on the shock absorber such that the seal member is attached inside the outer shell 1 without using the seal case 6. Thus, the attachment of the dust filter 4 to the outer shell 1 may be made not only in a direct manner as illustrated in FIG. 2, but also in an indirect manner via the seal case 6 or the like.

The outer periphery of the dust filter 4 is entirely brought into slidable contact with the inner periphery of the dust cover 3. The dust filter 4 is configured to be located in the dust cover 3 even when the shock absorber body D is in the most extended state, and arranged in the dust cover 3 at all times irrespective of the expansion and the contraction of the shock absorber body D.

It is necessary for the dust filter 4 to prevent an entry of the mud and the like into the dust cover 3 by filling gap between the outer shell 1 and the dust cover 3, and to permit the passage of air. Therefore, for example, the dust filter 4 may be formed as a sponge by foam molding synthetic resin, an annular brush, or an annular net in which a plurality of nets are stacked. Further, as the passage of the air is permitted by the dust filter 4, the dust cover 3 is not hermetically sealed, and the expansion and the contraction of the shock absorber body D are not hindered by reaction force exhibited by the gas inside the dust cover 3.

When the dust filter 4 is mounted on the outer shell 1 as described above, the dust filter 4 fills the space between the dust cover 3 and the outer shell 1, and thus the entry of the mud or the like into the space that is on the outer periphery of the piston rod 2 and that is in the dust cover 3 can be prevented. This makes it possible to prevent the mud or the like from adhering onto the piston rod 2.

Further, the attachment of the dust filter 4 does not hinder spray coating onto the outer surface of the outer shell 1, and the length of the dust cover 3 may be equal to that of the conventional shock absorber. Therefore, even when the coating is made with this state, an uncoated part is not caused on the outer surface of the outer shell 1 and therefore, rust on the outer shell 1 can be prevented. Furthermore, it is not necessary to employ such a complicated coating method as to keep the shock absorber body D in the most contracted state before attaching the dust cover 3, and to mask the piston rod 2 before coating the outer shell 1. The spray coating can be carried out without any change. Thus, coating processing is quite simple.

According to the shock absorber 100 of this embodiment as described thus far, it is possible to protect the outer periphery of the piston rod 2 sufficiently, and to prevent deterioration in coating workability.

Further, as the outer periphery of the dust filter 4 is brought into slidable contact with the inner periphery of the dust cover 3, it becomes possible to suppress axis displacement of the dust cover 3 in the radial direction.

Embodiments of this invention were described above, but the above embodiments are merely examples of applications of this invention, and the technical scope of this invention is not limited to the specific constitutions of the above embodiments.

This application claims priority based on Japanese Patent Application No. 2012-177903 filed with the Japan Patent Office on Aug. 10, 2012, the entire contents of which are incorporated into this specification.

The invention claimed is:

1. A shock absorber including a cylindrical outer shell and a piston rod slidably inserted into the outer shell, the shock absorber comprising:

a cylindrical dust cover coupled to the piston rod and permitting an entry of the outer shell to an inside thereof;

an annular dust filter whose inner peripheral side is attached to the outer shell and whose outer periphery is brought into slidable contact with an inner periphery of the dust cover at all times; and a cylindrical seal case provided on the outer shell at an end on a side of the piston rod, wherein the seal case includes:
- a cylindrical large-diameter portion attached to an inner periphery of the outer shell at the end on the side of the piston rod;
- a flange portion projecting from the large-diameter portion at an end, of the large-diameter portion, on a side of the piston rod toward an inner side;
- a cylindrical small-diameter portion rising from an inner periphery of the flange portion; and
- an annular stopper provided on the small-diameter portion, and wherein the dust filter has an upper surface inclined downward in a radial direction of the dust filter toward said outer periphery, and the dust filter is fixed to the outer shell by being sandwiched between the flange portion and the stopper.

* * * * *